United States Patent [19]

Walenty et al.

[11] Patent Number: 4,916,619

[45] Date of Patent: Apr. 10, 1990

[54] ADAPTIVE WHEEL SLIP THRESHOLD

[75] Inventors: Allen J. Walenty, Utica; Kevin G. Leppek, W. Bloomfield; Alex Kade, Grosse Pte. Woods, all of Mich.

[73] Assignee: General Motors Corporation, Detroit, Mich.

[21] Appl. No.: 337,726

[22] Filed: Apr. 13, 1989

[51] Int. Cl.$^4$ .............................................. B60T 8/00
[52] U.S. Cl. .............................. 364/426.02; 303/100; 303/106
[58] Field of Search ............... 364/426.02; 180/197; 361/238; 303/95, 100, 106, 107

[56] References Cited

U.S. PATENT DOCUMENTS

| | | | |
|---|---|---|---|
| 3,717,384 | 2/1973 | Harned | 303/107 |
| 4,530,059 | 7/1985 | Brearley et al. | 364/426.02 |
| 4,664,453 | 5/1987 | Kade | 303/100 |
| 4,666,218 | 5/1987 | Masaki et al. | 364/426.02 |
| 4,693,522 | 9/1987 | Wupper et al. | 364/426.02 |
| 4,715,662 | 12/1987 | Van Zanten et al. | 364/426.02 |
| 4,733,760 | 3/1988 | Inagaki et al. | 180/197 |
| 4,750,124 | 6/1988 | Lin et al. | 364/426.02 |
| 4,763,912 | 8/1988 | Matsuda | 180/197 |
| 4,794,538 | 12/1988 | Cao et al. | 364/426.02 |
| 4,797,825 | 1/1989 | Shimanuki et al. | 364/426.02 |
| 4,818,037 | 4/1989 | McEnnan | 364/426.02 |

OTHER PUBLICATIONS

Research Disclosure #295100, p. 924, Nov. 1988.

*Primary Examiner*—Gary Chin
*Attorney, Agent, or Firm*—Howard N. Conkey

[57] ABSTRACT

A brake control system is described that maximizes vehicle braking efficiency by first determining, and then cycling wheel brake pressure and consequently wheel slip about, the critical slip value for the road surface. As each road surface has unique tractive characteristics, the amount of brake pressure required to produce critical wheel slip, and hence maximum brake force, varies for different coefficient of friction road surfaces. This invention determines the coefficient of friction for the operating surface and adjusts the system slip threshold to accurately mimic the actual critical slip value for the road surface. The invention then applies and releases wheel brake pressure so as to cycle wheel slip about this critical slip value.

4 Claims, 4 Drawing Sheets

ADAPTIVE WHEEL SLIP THRESHOLD

BACKGROUND OF THE INVENTION

This invention relates to an antilock control system for vehicle wheel brakes.

When the brakes of a vehicle are applied, a braking force between the wheel and the road surface is generated that is dependent upon various parameters which include the road surface conditions and the amount of slip between the wheel and the road surface. The braking force increases as slip increases, until a critical value of slip is surpassed. Beyond this critical slip value, the braking force decreases and the wheel rapidly approaches lockup. If the wheel is allowed to lock, unstable braking occurs, and vehicle stopping distance on nondeformable surfaces increases. Thus, stable vehicle braking occurs when wheel slip does not exceed this critical slip value. An antilock control system achieves stable braking and minimizes stopping distance by cycling brake pressure such that braking force is maximized. This is accomplished by first detecting an incipient wheel lock condition, which indicates braking force has peaked and is now decreasing. One criteria that is used to indicate incipient wheel lock is excessive wheel deceleration and/or excessive wheel slip. Once an incipient wheel lock condition has been detected, pressure is relieved at the wheel brake. Upon releasing the brake pressure, the wheel begins reaccelerating toward recovery. The wheel is said to be recovered when wheel slip is reduced to a value below the critical slip value. When the wheel has substantially recovered, brake pressure is reapplied. Reapplication of brake pressure results in the wheel again approaching lockup and the wheel cycle process is repeated. Brake force and vehicle braking efficiency are maximized during braking by cycling the brake pressure around an optimum pressure so that wheel slip is at or near the critical slip value for the particular road surface. Since the brake force is a function of wheel brake pressure and road surface conditions, the critical slip value will change as road surface conditions vary. To optimize vehicle braking during a stop, whether on a changing or uniform road surface, the antilock control system must be able to respond to many road surfaces and cycle brake pressure around the pressure required to produce critical wheel slip for each particular road surface.

If the antilock system slip threshold is lower than the actual critical slip for the road surface, the system will release pressure too soon. This condition is called "under-braked", so named because the system is controlling wheel pressure so as to cycle about a slip value below the actual critical slip value, resulting in below optimal brake pressure and decreased braking efficiency. Conversely, if the system slip threshold is higher than the actual critical slip for the road surface, the system will not release pressure soon enough. This results in an "over-braked" wheel, characterized by longer periods of near-lock wheel instability as the system continuously overshoots the actual critical slip value for the road surface. Over-braking also decreases braking efficiency.

Most antilock brake systems have fixed slip thresholds. Recognizing that a fixed slip threshold may result in either over or under braking of the wheel, some systems attempt to compensate for having fixed thresholds by using deceleration as an indicator of when the actual critical slip for the road surface has been exceeded. A large deceleration value is often said to indicate when the wheel begins operating in the unstable region. Yet, due to the complex dynamic relationship between a braking wheel and a road surface, even using deceleration as a predictive indicator does not completely alleviate the problems of over and under braking associated with using fixed slip thresholds. This is due to the fact that, just as each road surface has a unique value of wheel slip which represents the point of maximum braking efficiency, the tractive characteristics of different road surfaces result in varying deceleration characteristics when the wheel begins locking.

Recognizing that different surfaces have different wheel reacceleration properties, one known system modifies a deceleration indicator based upon an estimate of surface tractive characteristics. This deceleration indicator is used in conjunction with wheel slip to indicate an incipient lock condition, and thereby compensate for the system having a fixed slip threshold which may be either too high or too low in relation to the actual critical slip value for the road surface. This system, described in U.S. Pat. No. 3,717,384, issued Feb. 20, 1973 to John L. Harned and assigned to the assignee of this invention, measures the peak reacceleration of the wheel as the wheel recovers from a lock condition. A low value ($< +4$ g's) of wheel reacceleration during recovery is classified as indicative of operation on a low coefficient of friction surface. The deceleration indicator is subsequently set to a small value ($-1$ g) which effectively compensates for the system having a fixed slip threshold which is greater than the actual critical slip value for a low coefficient surface. If, on the other hand, the peak reacceleration during recovery is a high value ($> +4$ g's), this known method sets the deceleration indicator to a greater value ($-2$ g's), effectively compensating for a fixed slip threshold which is below the actual critical slip for the road surface.

The use of a deceleration indicator, however, is an indirect and often inaccurate means of adjusting the antilock system's slip threshold so as to detect an incipient lock when the actual critical slip value for the road surface has been exceeded. To consistently modulate wheel brake pressure such that wheel slip cycles about the actual critical wheel slip, the system must be able to directly modify its wheel slip threshold to accurately mimic the unique critical wheel slip for the particular road surface. In doing so, the systems will avoid both the under and over braked conditions inherent in a fixed slip threshold system, while maximizing braking efficiency by cycling wheel slip very closely about the actual critical slip value for the road surface. A key element to determining the actual critical slip for the surface lies in the antilock system's ability to determine the coefficient of friction of the operating surface. Once the characteristics of the operating surface have been determined, the antilock system's next major task is to determine the correct value for the surface-dependent slip threshold. This value should accurately reflect the actual critical slip value for the road surface. By using an incipient lock slip threshold that mimics the actual critical slip for the road surface, both the under and over braked conditions are avoided, and braking efficiency is maximized. Optimal control is thereby achieved by insuring wheel slip is closely cycled around the actual critical slip value for the road surface.

SUMMARY OF THE INVENTION

This invention provides a means for modifying the system slip threshold to reflect the actual critical wheel slip for the operating surface. By doing so, this invention maximizes vehicle braking efficiency by maximizing the amount of time spent cycling wheel slip substantially a the critical slip value for the road surface.

The invention calculates the dynamic wheel parameters of wheel slip and acceleration, measures instantaneous wheel brake pressure and determines the coefficient of friction of the operating surface. The system then, based upon the detected surface, increases and/or decreases the system slip threshold to match the critical slip value of the operating surface. By using a slip threshold calculated to accurately mimic the actual critical slip for the road surface, the system cycles wheel brake pressure such that wheel slip is substantially at the actual critical slip value for the road surface. This maximizes vehicle braking efficiency.

DESCRIPTION OF THE DRAWINGS

The invention may be best understood by referencing the following description of the preferred embodiment and the drawings in which.

DESCRIPTION OF THE PREFERRED EMBODIMENT

Figure 1:
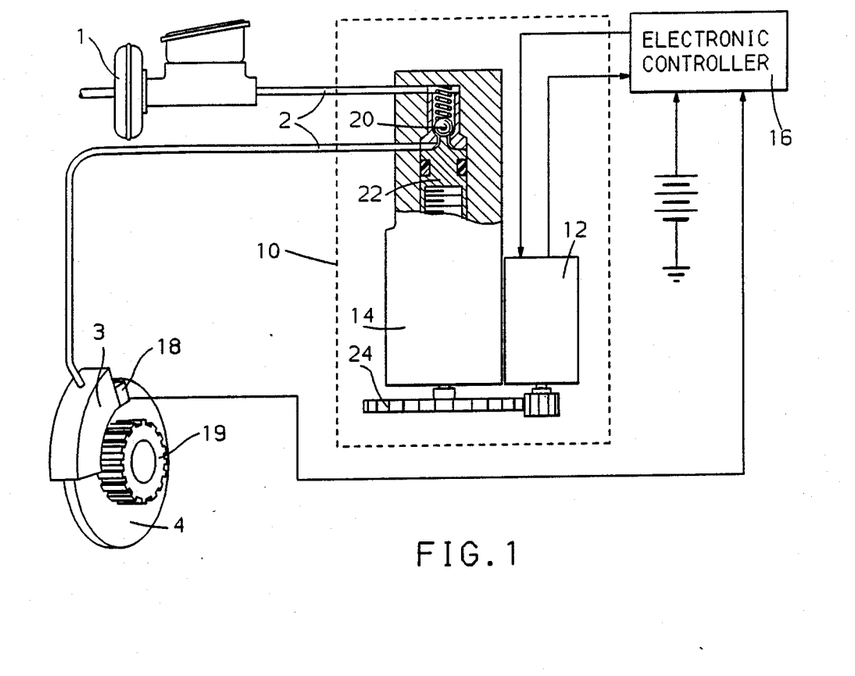
FIG. 1 is a general diagram of a braking system for controlling the brakes in accord with the principles of the invention.

An overview of the preferred embodiment is detailed in FIG. 1. The vehicle braking system is composed of a hydraulic boost unit 1 and brake lines 2 going to the wheel brake, such as a caliper 3 located at the rotor 4, of a vehicle wheel. With the addition of the antilock control system, the total vehicle braking system is comprised of the standard base braking components and (a) an electronic controller 16, (b) a wheel speed assembly 18 mounted at the wheel near (c) an excitor ring 19, and (d) a modulator assembly 10 described by the following mechanical relationships: (1) a DC motor 12 drives a gear train 24, turning a ball screw actuator 14, which is composed of a linear ball screw and nut; (2) as the linear ball screw rotates, the nut is moved either forward or backward; (3) when the DC motor drives the linear ball screw in the apply direction, the nut moves forward and the piston 22 is applied toward the top of travel; (4) the check ball 20 is unseated and held open when the piston 22 is at the top of travel; (5) when the DC motor 12 is reversed, the linear ball screw rotates in the opposite direction and the nut moves backward, allowing the piston 22 to be backdriven by wheel brake pressure; (6) the check ball 20 seats when the piston is allowed to leave the top of travel, effectively isolating the base brake boost 1 from the wheel brake.

The antilock control system in this embodiment is operative at all times while the vehicle is in operation. As the vehicle wheel rotates, the excitor ring 19 rotates, causing the wheel speed sensor 18 to generate a signal proportional to the wheel speed. The signal is sent from the wheel speed sensor 18 to the electronic controller 16 for processing. The ball screw actuator 14, as shown in FIG. 1, is in the passive mode with check ball 20 held open by the piston 22 at the top of travel. When the driver of the vehicle applies the brakes, with antilock passive, the hydraulic fluid can pass through the brake line 2 past the check ball 20 and through to the wheel brake caliper 3. Thus the antilock system is said to be transparent during normal braking.

The antilock control system detects incipient wheel lockup based upon the dynamic parameters of vehicle wheel slip and wheel deceleration. The information from the wheel speed sensor 18 is used by the electronic controller 16 to calculate wheel slip and acceleration. Upon detecting an incipient lock condition, indicated by high wheel deceleration and/or more particular to this invention excessive wheel slip, the controller 16 initiates antilock activity. The electric controller 16 commands the DC motor 12 to reverse the ball screw actuator 14, causing the piston 22 to retract and the check ball 20 to seat, isolating the boost portion 1 of the hydraulics from the wheel brake. As the piston 22 retracts, pressure at the wheel brake is relieved, allowing the wheel to begin to reaccelerate toward recovery. Upon sensing wheel recovery, the controller 16 commands the motor 12 to reapply pressure, causing the ball screw actuator 14 to move forward, applying the piston 22 and returning fluid back to the wheel brake caliper 3. Wheel brake pressure is then increased toward the optimal pressure for the road surface. When the wheel again begins to approach lock, the wheel cycle process is repeated. A wheel cycle is defined as beginning with the detection of incipient lock and the subsequent release of pressure and ending when the pressure has been reapplied to the point just prior to incipient lock.

During this wheel cycling process, the power consumed by the electric DC motor 12 while increasing pressure is directly proportional to the rotational torque exerted by the motor on the gear train 24. The rotational torque is translated through the linear ball screw and nut as a linear force to the piston head 22. The pressure present at the piston head is proportional to the wheel brake pressure. Thus, given (a) the equation $W = I^2R$ relating motor power, W, to motor current, I, and resistance, R, and (b) the above mechanical relationships, the current draw, I, of the motor 12 can be considered proportional to the wheel brake pressure, P.

Figure 2:
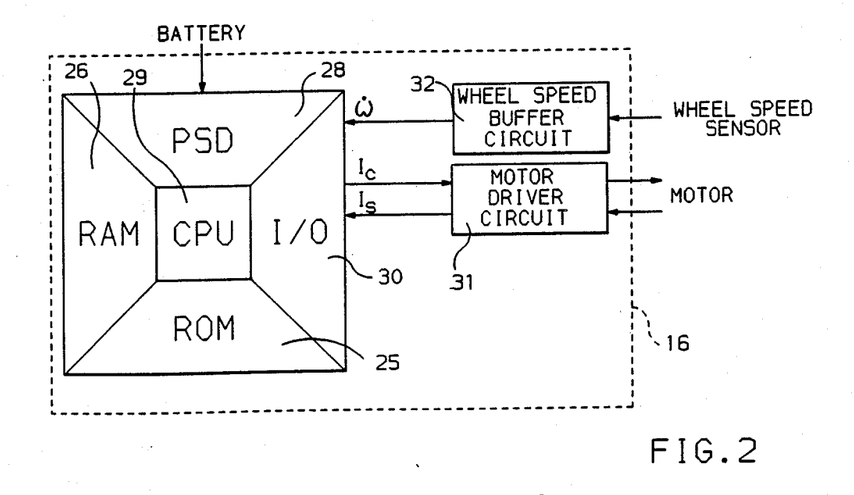
FIG. 2 is a diagram of the electronic controller.

Based on the stated relationship between motor current, I, and wheel brake pressure, P, the electronic controller 16 implements instructions to achieve the desired wheel brake pressure. As shown in FIG. 2, the electronic controller 16 consists of (a) a common digital computer composed of read-only memory (ROM) 25, random access memory (RAM) 26, a power supply device (PSD) 28, an instruction processing architecture embodied in the central processing unit (CPU) 29, and input/output circuitry (I/O) 30 which interface to the (b) motor driver circuit 31 and (c) wheel speed sensor buffer circuit 32.

Figure 3:
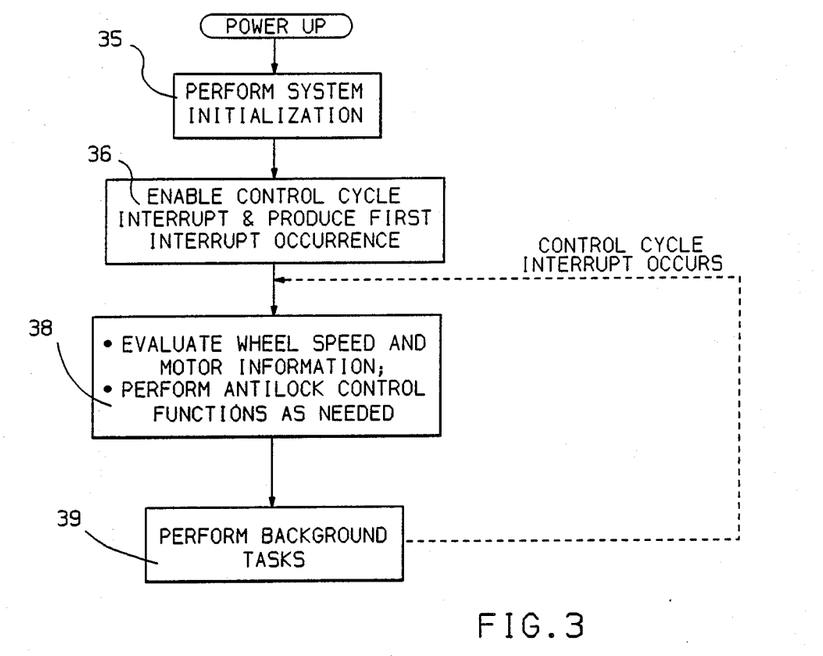
FIGS. 3, 4a and 4b are flowcharts detailing the operation of the electronic controller.
Figure 4A:
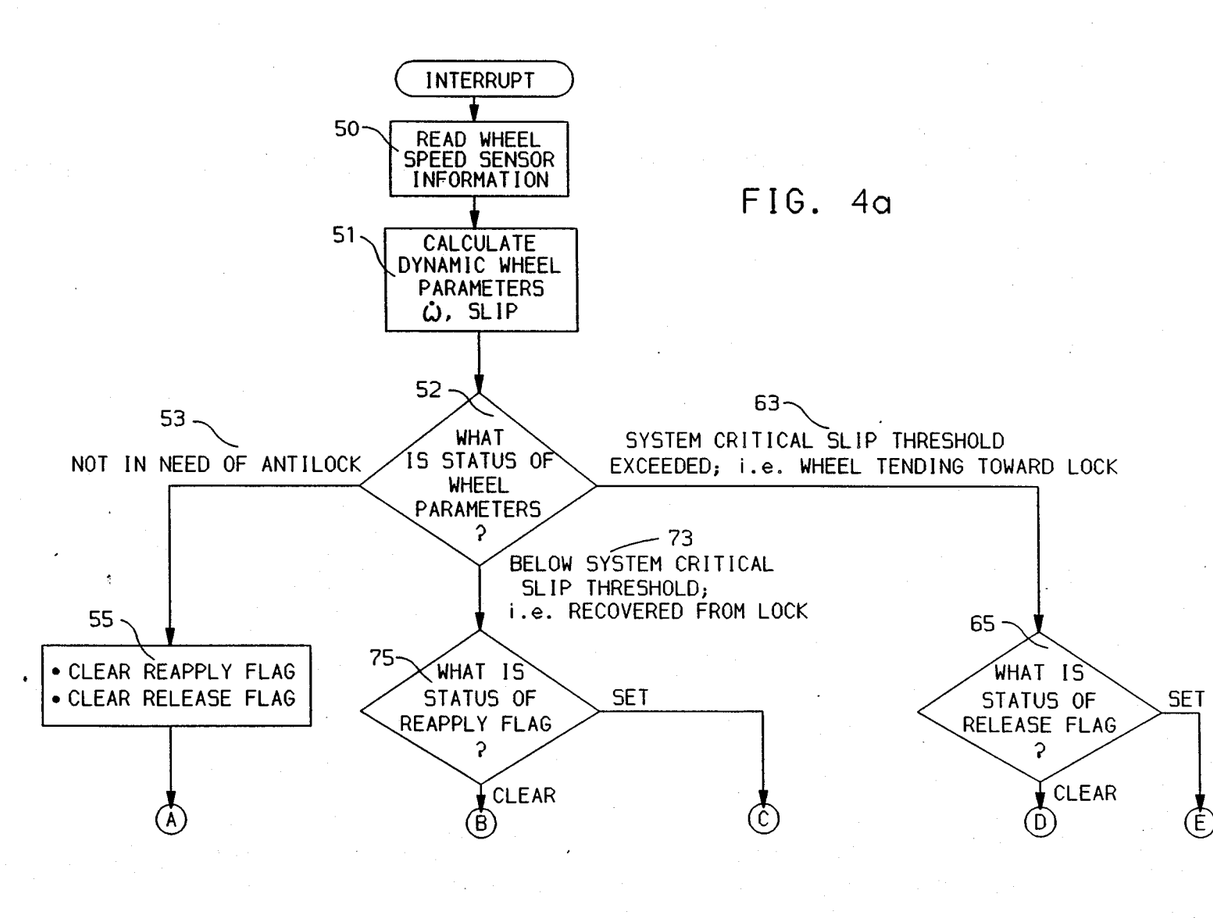
Figure 4B:
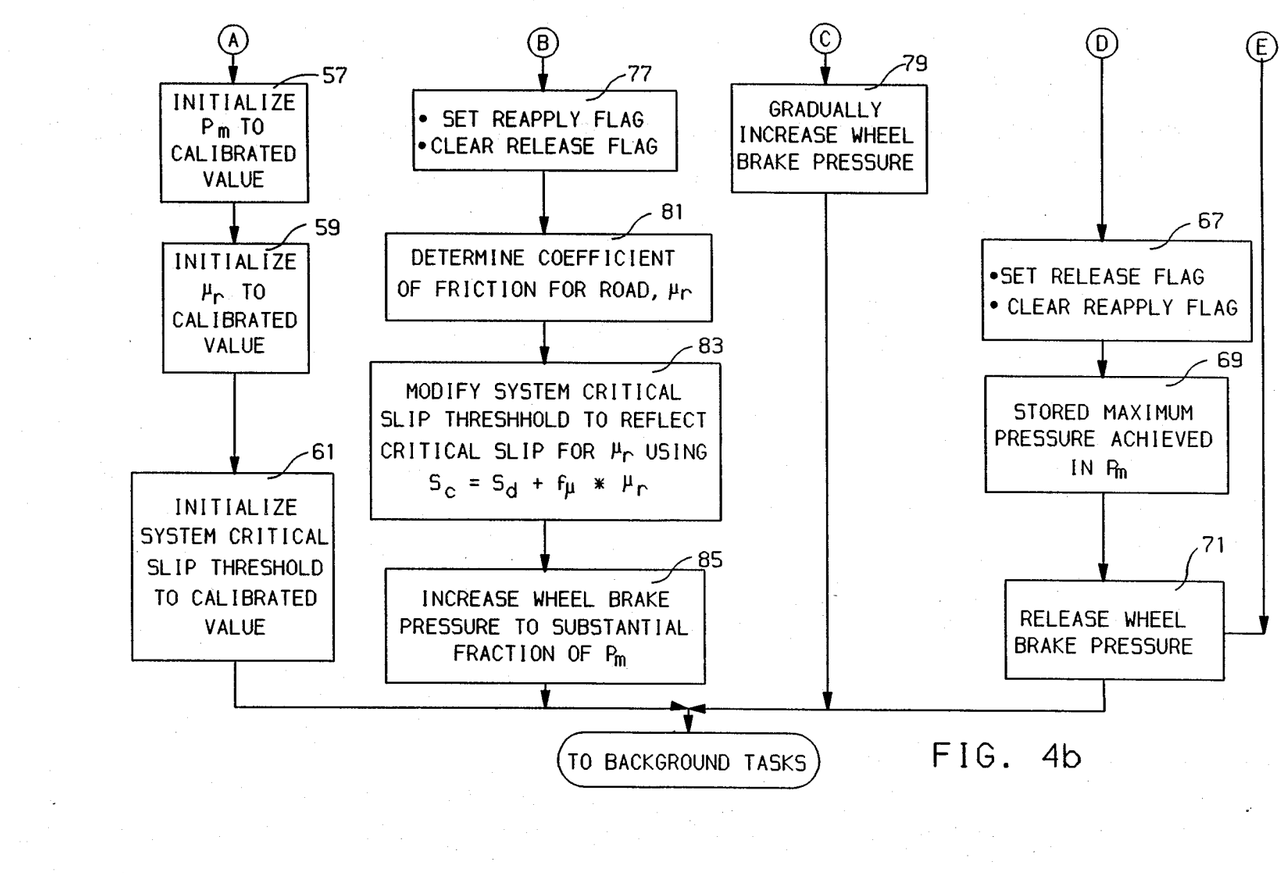

The ROM 25 contains the instructions necessary to implement the algorithm diagrammed in FIGS. 3 and 4. It should be noted that in describing the functions of the algorithm encoded in the ROM, references to tasks which have been detailed as flow diagram function blocks will be designated by <nn> where nn is the diagram reference number and < > indicates that the concept described by the particular flow diagram function block text is being referenced. The text in the flow diagram function block is intended to describe the general task or process being executed by the controller at that point. The text does not represent the actual ROM instructions. It is recognized that there are a variety of known information-processing languages available to one skilled in the art to construct the actual instructions necessary to accomplish the tasks described by the text in the flow diagram function blocks.

When the antilock system is powered-up, via the vehicle ignition or other means, the controller 16 will begin executing the instructions encoded in ROM 25. As shown in FIG. 3, the controller 16 will first perform system initialization <35>, which entails clearing registers, initializing specific RAM variables to calibrated values, stabilizing voltage levels at the I/O and other basic functions of the digital computer. The system initialization process also includes insuring the linear ball screw actuator 14 is in the passive, or as earlier described, the transparent, mode shown in FIG. 1. The actuator is said to be transparent to the base braking functionality of the vehicle while the check ball 20 is unseated and is held open by the piston 22, allowing hydraulic boost 1 to reach the wheel brake.

Once the system has been initialized, the controller 16 will enable the control cycle interrupt <36>. The control cycle interrupt provides a means for accurately calculating the dynamic wheel parameters of wheel slip and acceleration by insuring that the time between calculations is fixed at a value such as 5 msec. Once a control cycle interrupt has occurred, the controller 16 proceeds through the major loop referred to as the "control cycle". During the control cycle, the controller performs both brake control processing tasks <38> and background tasks <39>. The brake control tasks include: reading and processing the wheel speed and DC motor signal information, determining whether antilock control is necessary, and performing antilock control functions as needed. Whether or not antilock control is required, the controller always evaluates wheel speed and calculates the dynamic wheel parameters. After executing the brake control tasks, the controller proceeds to the background tasks <39>. The background tasks consist of diagnostic self-check activities and communication with off-board devices such as other vehicle controllers or service tools. All of these control cycle tasks are performed once every control cycle interrupt. Upon receiving a control cycle interrupt, the controller executes the brake control functions <38> and background tasks <39>. Thus, every control cycle, the controller evaluates the need for antilock activities, performs these activities as needed, and carries out diagnostic and off-board communications activities.

Turning now to FIG. 4, the steps necessary to implement the general brake control functions <38> are detailed. When the driver of the vehicle begins braking, fluid is applied to the wheel brake. As the wheel brake pressure increases, the wheel begins to decelerate. As explained earlier, the controller 16 is operative at all times, and executes the instructions, encoded in ROM, within the confines of the control cycle interrupt. Thus, the controller 16, upon receiving a control cycle interrupt, proceeds to read the wheel speed sensor information <50> and calculate the dynamic wheel parameters of wheel slip and acceleration <51>. While the wheel brake pressure is at a value substantially below the pressure required to produce critical slip for the road surface, the status of the dynamic parameters <52> will indicate antilock control is not necessary <53>. The controller subsequently clears the release and reapply flags <55>, initializes the reference pressure value, $P_m$, to a calibrated value <57>, initializes the detected surface coefficient, $\mu_r$, to a calibrated value <59> and initializes the system slip threshold to a calibrated value <61>. The system slip threshold is used at step <52> to determine whether an incipient lock condition exists. The controller continues the control cycle, proceeding to the background tasks. Since no antilock activities were initiated, the actuator remains in the transparent mode. Given that the driver of the vehicle continues to apply the brakes, wheel brake pressure increases toward, and soon surpasses, the ideal pressure for the road surface.

Once wheel brake pressure exceeds the ideal pressure for the road surface, the wheel rapidly approaches lock. With the beginning of the control cycle, the controller again reads the wheel speed information <50>, calculates wheel slip and acceleration <51>, and evaluates the status of the dynamic parameters <52>. At this point, the dynamic parameters indicate an incipient lock condition <63>. This condition is typified by wheel slip exceeding the system slip threshold. Having determined to initiate antilock activities, the controller first evaluates the status of the release flag <65>, which, based upon the prior control cycle activity, is clear. Note that whenever the release flag is clear, it is indicating that the system was not performing a release during the prior control cycle. Similarly, whenever the reapply flag is clear, it is indicating that a reapply was not being performed during the prior control cycle. Keeping with the purpose of these flags, the release flag is set and the reapply flag is cleared <67>. Having determined that the wheel is approaching lock and that the system was not already performing a release, the controller stores the most recent commanded pressure, $P_m$, which is the reference pressure <69>. This reference pressure is the maximum wheel brake pressure achieved during the wheel cycle, and represents the pressure required to produce incipient wheel lock. Due to the mechanical relationships previously related, the wheel brake pressure is proportional to the motor current. The motor current draw, $I_s$, as sensed by the controller 16 through the motor driver circuit 31, can be considered representative of actual wheel brake pressure, $P_m$, and is stored as such.

It should be reiterated that in this embodiment, the actuator is in the transparent mode prior to initiating antilock activities. Due to this feature, a calibrated value has been stored as $P_m$ for this first wheel cycle. The calibrated value for $P_m$ was established during the previous control cycle when antilock control activity was not required (flow diagram path <52>-<53>-<55>-<57>-<59>-<61>). Also, a calibrated value for the road surface coefficient, $\mu_r$, has been stored. This is because, in this embodiment, the calculation of $\mu_r$ is dependent upon $P_m$, as will be detailed later. Since $P_m$ has been set to a default value, it follows that $\mu_r$ must also be established at some default value. Consistently, it also follows that the system slip threshold, which is dependent upon $\mu_r$, has also been set to a calibration value. The system slip threshold is used at step <52> to indicate when an incipient wheel lock condition exists. During later wheel cycles, i.e. after the initiation of antilock activities, the actuator is no longer transparent. Referring to the earlier description of the modulator 10, the DC motor 12 will now be driving the actuator 14. Thus the actual value of $I_s$, rather than a calibrated value, is stored in $P_m$ during later wheel cycles. When an actual value of $P_m$ is determined, the system can calculate road surface coefficient, $\mu_r$, and from this modify the system slip threshold to reflect the actual critical slip for the surface. These processes will be described later in this disclosure.

Returning to the description of the path <52>-<63>-<65>-<67>-<69>, having determined an incipient wheel lock condition is present, the controller 16 commands the actuator to release wheel brake pressure <71>. This is accomplished by rotating the motor 12 in the reverse direction, which retracts the piston 22, seats the check ball 20, isolates the wheel brake from the boost 1 and relieves pressure at the wheel brake. The controller completes the control cycle by proceeding to execute the background tasks.

Governed by the control cycle interrupt, the controller continues reading wheel speed information <50>, calculating dynamic wheel parameters <51>, and evaluating the status of these wheel parameters <52> every interrupt control cycle. While the wheel is still tending to lock <63>, the release flag remains set (as it was set during the first time through this path) and the controller proceeds from determining the status of the release flag <65> directly to relieving wheel brake pressure <71>, and does not disturb the stored value of $P_m$.

Eventually, sufficient pressure will be relieved to allow wheel recovery. With the beginning of another control cycle, the controller proceeds, as usual, through steps <50>, <51> and <52>, and determines that the dynamic parameters indicate the wheel is now substantially recovered <73>. Substantial recovery occurs when wheel slip is below the system slip threshold. Again, recall that until the controller is able to affirmatively establish a system slip threshold value, the default value established during path <63>-<65>-<67>-<69>-<71> is used. Returning to the description of path <52>-<73>, the controller next evaluates the status of the reapply flag <75>, which, based upon the prior control cycle activity, is clear. Keeping with the purpose of the reapply and release flags, the reapply flag is set and the release flag is cleared <77>.

Next, the controller determines the coefficient of friction for the operating surface <81>, in a manner such as illustrated in Research Disclosure, #295100, page 924, November 1988. This is done by first weighting $P_m$, the reference pressure, as being indicative of either a high, medium or low coefficient surface. If $P_m$, the maximum brake pressure achieved during the wheel cycle, is a large value (e.g. >1200 p.s.i.), it is considered indicative of operation on a high coefficient of friction surface and is weighted with a value representative of a high mu surface (0.8–1.0). Similarly, a moderate (600–1200 p.s.i.) value of $P_m$ is considered indicative of a medium coefficient surface and is weighted as such (0.4–0.8), while a low value of $P_m$ (<600 p.s.i.) is indicative of a low coefficient of friction and is weighted with a low mu surface value (0.05–0.4). Next, the peak wheel reacceleration is likewise weighted. Thus, a high peak reacceleration (>6 g's) is considered indicative of a high coefficient of friction and is correspondingly weighted to represent a high mu surface (0.8–1.0), a moderate (2–6 g's) peak reacceleration is indicative of a medium coefficient and is weighted accordingly (0.4–0.8), while a small (<2 g's) peak reacceleration is indicative of a low coefficient surface and is weighted to represent a low mu surface (0.05–0.4). Expressed as a mathematical ranging relationship, the weighting process appears as:

if $P_m$ > 1200 p.s.i. then $W_{Pm}$ = 0.8 to 1.0
if 1200 p.s.i. ≧ $P_m$ ≧ 600 p.s.i. then $W_{Pm}$ = 0.4 to 0.8
if $P_m$ < 600 p.s.i. then $W_{Pm}$ = 0.05 to 0.4
and
if $a_p$ > +6 g's then $W_{ap}$ = 0.8 to 1.0
if +6 g's ≧ $a_p$ ≧ +2 g's then $W_{ap}$ = 0.4 to 0.8
if $a_p$ < +2 g's then $W_{ap}$ = 0.05 to 0.4 where $P_m$ is the maximum pressure achieved during the wheel cycle, $a_p$ is the peak wheel reacceleration during recovery and $W_{Pm}$ and $W_{ap}$ are the weight terms for $P_m$ and $a_p$, respectively. The weights are then averaged to arrive at the value for the coefficient of friction for the operating surface:

$$\mu_r = \tfrac{1}{2}(W_{Pm} + W_{ap})$$

where $\mu_r$ is the measured coefficient of friction for the operating surface. It should be understood that the values attributed to the pressure and peak reacceleration ranges as well as the weight attributed to those ranges are given for the purpose of illustration and are not to be considered limiting. Through the use of skill in the art, one could assign various values to define the ranges and the weights attributed to those ranges to suit a particular application.

By using the measured coefficient of friction, the controller calculates the actual critical slip for the operating surface at step <83> using the following formula:

$$s_c = s_d + f_\mu * \mu_r$$

where $s_d$ is the default, or calibrated, value for the system slip threshold, $\mu_r$ is the coefficient of friction for the operating surface as measured earlier, and $f_\mu$ is a surface adjustment factor. The surface adjustment factor is a real number which, based on $\mu_r$, is either positive or negative. This allows for a multiple of the measured surface coefficient, $\mu_r$, to be added to or subtracted from $s_d$ to arrive at the proper value for $s_c$. Thus, the system slip threshold is adjusted up or down, depending upon the operating surface, to reflect the actual critical slip value for the road.

Since the wheel has recovered, pressure can be reapplied to the wheel brake <85>. The controller initiates the reapply by commanding the motor to produce the torque necessary to achieve a significant fraction of the previously stored reference pressure, $P_m$. As related during the background discussion, braking efficiency is maximized by striving to brake at or near the pressure required to produce critical wheel slip. Therefore, the initial reapply proceeds rapidly to a significant fraction of $P_m$. During subsequent control cycles, while the wheel is still operating in the stable braking region, the controller proceeds along the flow path <50>-<51>-<52>-<75> directly to <79>, as the reapply flag has been set. Since a significant fraction of the reference pressure was reached during the last control loop path <52>-<75>-<77> through <85>, the motor torque is increased slowly, which gradually increases pressure from the substantial fraction toward the pressure required to produce critical wheel slip.

Given that the system slip threshold has been modified to mimic the actual critical slip value for the road surface, once wheel brake pressure has been increased to the point that this value of slip is present at the wheel, an incipient lock condition will be detected. Because the system detects an incipient lock when wheel slip has exceeded the system slip threshold, the modification of the slip threshold to mimic the actual critical slip enables the system to detect an incipient lock condition as it is actually occurring. Without such modification, the system risks either over or under braking the wheel depending on if the system slip threshold is higher or lower, respectively, than the actual critical slip value. With the detection of the incipient lock, the controller begins executing path <52>-<63> again. Proceeding as described before, the status of the release flag will be clear <65>. The release and reapply flags are updated <67> and the maximum wheel brake pressure achieved during the completed wheel cycle is stored in $P_m$ <69>. Brake pressure is relieved <71>, and continues to be relieved (path <52>-<63>-<65>-<71>) until the incipient lock condition is remedied.

Once wheel slip falls below the system slip threshold, the controller will again proceed along path <52>-<73>-<75>-<77>, recalculating the coefficient of friction for the road surface <81> and modifying the system slip threshold to accurately mimic the actual critical slip value for the road surface <83>.

By continuing the processes described, the controller is able to determine the unique critical slip value at which a lock condition will occur on the given operating surface and, by alternately releasing and reapplying wheel brake pressure, based upon the determined critical slip value, maintain wheel slip substantially at the value of slip which produces maximum vehicle brake efficiency.

The foregoing description of a preferred embodiment for the purpose of illustrating the principles of this invention is not to be considered as limiting or restricting the invention since many modifications may be made by the exercise of skill in the art without departing from the scope of the invention.

The embodiments of the invention in which an exclusive property or privilege is claimed are defined as follows:

1. A system for controlling a pressure applied to a brake of a vehicle wheel traveling over a road surface, the pressure applied establishing a braking force between the wheel and road surface, the system composed of:
   means for measuring an amount of slip present between the vehicle wheel and the road surface;
   means for detecting an incipient wheel lock condition when the measured slip exceeds an adjustable slip threshold value;
   means for decreasing pressure to the brake of the vehicle wheel in response to the detected incipient wheel lock condition;
   means for measuring a coefficient of friction between the vehicle wheel and the road surface;
   means for determining a critical slip value, $s_c$, at which the braking force is a maximum for the measured coefficient of friction;
   means for adjusting the adjustable slip threshold value equal to the determined critical slip value;
   means for detecting a wheel recovery condition resulting from the amount of slip falling below the adjustable slip threshold value; and
   means for increasing pressure applied to the brake of the vehicle wheel in response to the detected recovery condition.

2. A system of claim 1 wherein the critical slip value, $s_c$, is determined in accord with the expression:

$$s_c = s_d + f_\mu * \mu_r$$

where $s_d$ is a calibrated value of slip, $f_\mu$ is a calibrated factor for determining a variance from the calibrated value of slip and $\mu_r$ is the measured coefficient of friction between the vehicle wheel and the road surface.

3. A method for limiting a pressure applied to a brake of a vehicle wheel traveling over a road surface comprising the steps of:
   measuring an amount of slip between the vehicle wheel and the road surface;
   detecting an incipient wheel lock condition when the measured amount of slip exceeds an adjustable slip threshold value;
   decreasing pressure to the brake of the vehicle wheel in response to the detected incipient wheel lock condition;
   measuring a coefficient of friction between the vehicle wheel and the road surface;
   determining a critical slip value, $s_c$, at which the braking force is a maximum for the measured coefficient of friction in accord with the expression $s_c = s_d + f_\mu * \mu_r$ where $s_d$ is a calibrated value of slip, $f_\mu$ is a calibrated factor for determining a variance from the calibrated value of slip and $\mu_r$ is the measured coefficient of friction between the vehicle wheel and the road surface;
   adjusting the adjustable slip threshold value equal to the determined critical slip value $s_c$;
   detecting a wheel recovery condition resulting from the amount of slip falling below the adjustable slip threshold value; and
   increasing pressure applied to the brake of the vehicle wheel in response to the detected recovery condition.

4. A method for limiting a pressure applied to a brake of a vehicle travelling over a road surface comprising the steps of:
   measuring an amount of slip between the vehicle wheel and the road surface;
   detecting an incipient wheel lock condition when the measured amount of slip exceeds an adjustable slip threshold value;
   measuring an amount of pressure present at the brake of the vehicle wheel when the incipient lock condition is detected;
   weighting the amount of pressure measured such that (a) a small value of pressure is weighted to be indicative of a low coefficient of friction between the vehicle wheel and the road surface, (b) a moderate value of pressure is weighted to be indicative of a medium coefficient of friction between the vehicle wheel and the road surface, and (c) a large value of pressure is weighted to be indicative of a high coefficient of friction between the vehicle wheel and the road surface;
   decreasing pressure to the brake of the vehicle wheel in response to the detected incipient wheel lock condition;
   measuring an amount of vehicle wheel reacceleration resulting from the decrease in brake pressure;

determining a peak value of vehicle wheel reacceleration;

weighting the peak value of vehicle wheel reacceleration such that (a) a small value of peak reacceleration is weighted to be indicative of a low coefficient of friction between the vehicle wheel and the road surface, (b) a moderate value of peak reacceleration is weighted to be indicative of a medium coefficient of friction between the vehicle wheel and the road surface, and (c) a large value of peak reacceleration is weighted to be indicative of a high coefficient of friction between the vehicle wheel and the road surface;

averaging the pressure weight and peak reacceleration weight to arrive at a value representative of a measured coefficient of friction between the vehicle wheel and road surface;

determining a critical slip value, $s_c$, at which the braking force is a maximum for the measured coefficient of friction using the expression $s_c = s_d + f_\mu * \mu_r$ where $s_d$ is a calibrated value of slip, $f_\mu$ is a calibrated factor for determining a variance from the calibrated value of slip and $\mu_r$ is the measured coefficient of friction between the vehicle wheel and the road surface;

adjusting the adjustable slip threshold value equal to the determined critical slip value $s_c$;

detecting a wheel recovery condition resulting from the amount of slip falling below the adjustable slip threshold value; and increasing pressure applied to the brake of the vehicle wheel in response to the detected recovery condition.

* * * * *